Patented Nov. 5, 1946

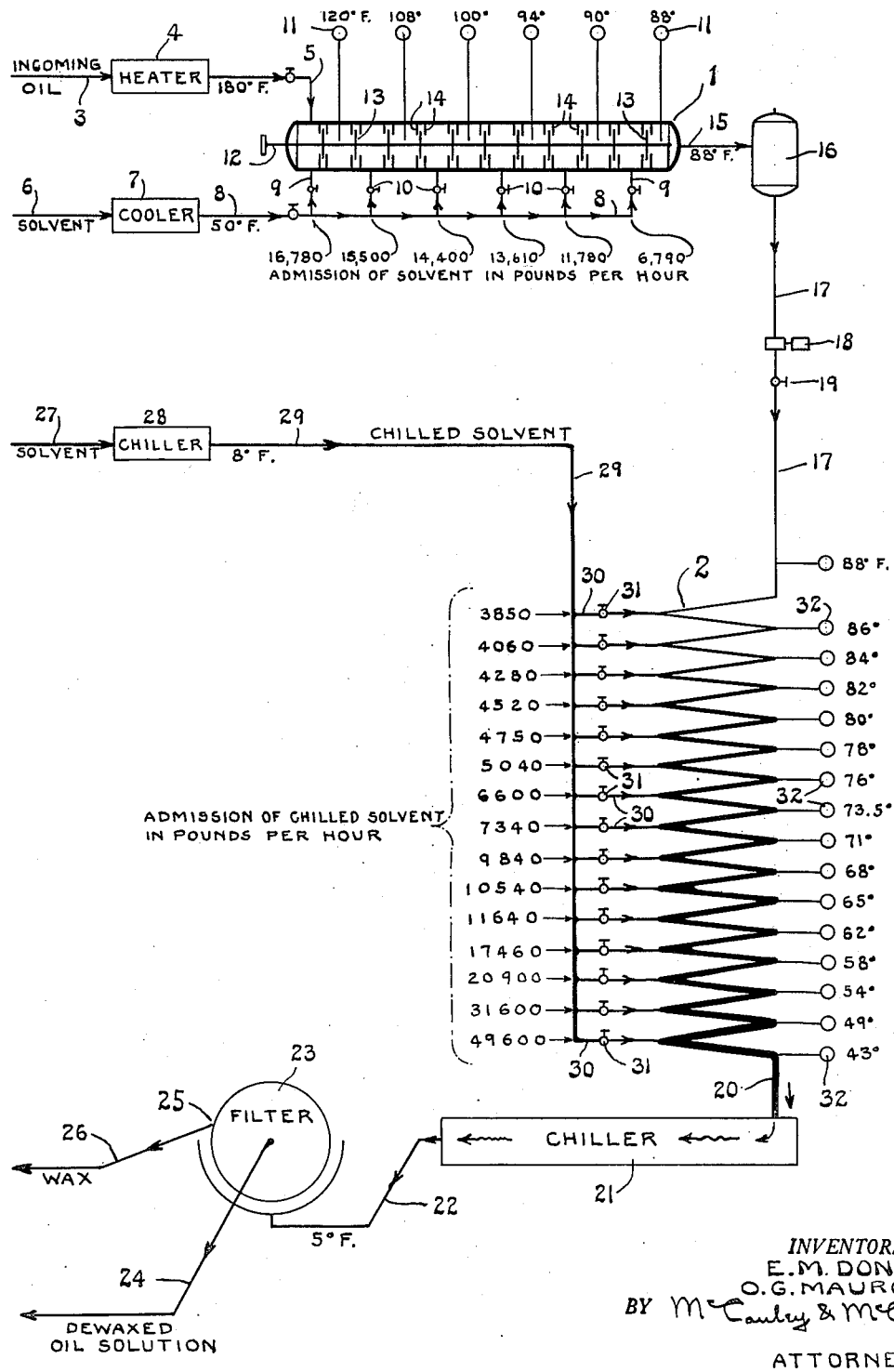

2,410,483

UNITED STATES PATENT OFFICE 2,410,483

PROCESSES OF DEWAXING OILS

Eddie M. Dons and Oswald G. Mauro, Tulsa, Okla., assignors to Mid-Continent Petroleum Corporation, Tulsa, Okla., a corporation of Delaware Application November 13, 1944, Serial No. 563,284

2 Claims. (Cl. 196—18)

This invention relates to processes of dewaxing oils wherein selective dewaxing solvents are employed to aid in solidifying the wax. The apparatus herein shown is claimed in a patent application filed by us on November 17, 1944, Serial No. 563,814. An object of the invention is to produce wax crystals that can be efficiently separated from the oil solution without retaining the usual excessive quantities of oil solution in the separated wax. Prior to this invention, the wax has been precipitated and transmitted to a filter, or other separating apparatus, in the form of non-uniform crystals which are not efficiently separated from the oil solution. For example, in a filtering operation, a mixture of non-uniform wax crystals will tend to reduce the rate of filtration while also trapping excessive quantities of oil solution in the wax cake on the surface of the filter.

For many years, this objectionable condition has been clearly recognized and well understood by the experts in this art, and efforts have been made to produce the desired uniform wax crystals. However, so far as we are aware, the prior efforts have failed to solve this oil problem. The conventional dewaxing processes now in general commercial use produce a rather haphazard mixture of large and small wax crystals which reduce the rate of filtration, while trapping excessive quantities of oil solution in the mass of non-uniform crystals on the filter.

The system herein disclosed involves special cooperative conditions which begin by deliberately forming a multiplicity of extremely minute wax nuclei crystals, and continue at successive stages where we have created conditions which progressively increase the growth of the selected minute nuclei crystals. Actual tests have clearly shown that these new conditions produce relatively large and approximately uniform wax crystals. The rate of filtration has been very profitably increased, and the yield of dewaxed oil was likewise increased. Furthermore, the wax product containing a relatively small percentage of oil solution, can be purified at a relatively low cost.

With the foregoing and other objects in view, the invention comprises all of the novel cooperative details herein shown and described, but it is to be understood that the scope of this patent extends to modifications and variations described by terms of the claims hereunto appended.

The drawing is a diagrammatical view of a dewaxing system embodying features of this invention.

To illustrate one form of the invention we will describe details of a blending chamber 1 for the incoming oil and solvent, and also refer to a pipe coil 2 for subsequent operations. For convenience in explaining unusual variations, the drawing specifically sets forth volumes of cooled solvent to be added at successive stages, as well as specific temperatures at such stages. However, it is to be understood that these specific details are merely for a general comprehension of an unexpected new subject, and that the invention is not limited to such details. We desire to begin by producing an oil solution at approximately the cloud point of the solution, or within about 10° F. of the cloud point, and this can be accomplished in any suitable manner.

The drawing shows that the blending chamber 1 forms a relatively large elongated passageway, and that a continuous stream of the incoming oil charge from pipe 3 is transmitted through a heater 4 and thence through pipe 5 to one end of said passageway. A continuous stream of dewaxing solvent is transmitted from a pipe 6 and forced through a cooler 7 to a pipe 8 having branches 9 leading to successive stages in the elongated blending chamber 1. The branches 9 are provided with regulating valves 10 set for gradual decreases in the admission of cooled solvent, as suggested by specific conditions set forth in the drawing. Under these conditions the slowly advancing mixed stream in the chamber 1 will be gradually cooled as shown at temperature indicators 11. At the beginning there is a very rapid decrease in temperature, but this is followed by a carefully regulated decreased cooling for the purpose of merely producing a cloud point, or within about ten degrees of the cloud point.

We desire to carefully produce the extremely tiny wax crystals at the cloud point and thereafter uniformly increase the growth of each of these nuclei wax crystals. This cloud point may be produced in any suitable manner. However, the idea of carefully producing and then very gradually enlarging the minute wax crystals seems to be a novel subject, involving special cooperative conditions.

The blending chamber 1 may be provided with a rotating shaft 12 provided with agitators 13 which cooperate with fixed members 14 to forcibly blend the incoming solvent with the oil. The mixture formed in this chamber 1 may be discharged through a pipe 15 to a tank 16, and then to a pipe 17 leading to the pipe coil 2, said pipe 17 having a pump 18 and valve 19, or other suitable means to regulate the delivery of the mixture to the pipe coil 2.

This pipe coil 2 is merely a diagrammatical illustration of successive passageways which may be arranged in any desired manner to provide for successive operating stages wherein the minute wax nuclei crystals are gradually enlarged for the purposes of the invention herein disclosed. However, for convenience in briefly describing the invention, we have shown a single coil having an outlet 20 at the bottom leading to a chiller 21 where the mixture is subjected to comparatively rapid chilling, and then discharged through a pipe 22 to a conventional filtering apparatus including a rotary filter 23. The dewaxed solution passes through the filter and escapes through a discharge pipe 24, while the wax crystals are deposited on the periphery of said filter, so as to form a relatively thick wax cake which is removed at 25 and discharged through a conductor 26.

The coil 2 herein shown is associated with a source of dewaxing solvent which flows in a continuous stream under pressure from a pipe 27, and through a chiller 28 to a pipe 29 having numerous branches 30 leading to successive inlets of the cooling coil 2. Each branch 30 is provided with suitable regulating means diagrammatically indicated by valves 31. The regulating devices are carefully adjusted to progressively increase the admission of chilled dewaxing solvent to the mixture advancing through the coil 2. A specific example of increases in the admission of chilled solvent appears at the left side of the coil 2. Study of this specific example will show that relatively small but progressively increasing quantities of the chilled solvent are injected during initial stages of the growth of the tiny nuclei crystals, so as to positively provide for most gradual and uniform preliminary growth during said initial stages.

This involves one of the critical conditions in our plan for approximately uniform growth of the extremely minute nuclei crystals formed at the cloud point. However, as suggested in the specific example at the left side of coil 2, we can progressively increase the admission of chilled dewaxing solvent at subsequent stages to more rapidly increase the rate of growth of the wax crystals.

The linear velocity of the mixed stream in the coil 2 is preferably between one-fourth of a foot and three feet per second, and the pipe coil 2 is composed of pipes having progressively increasing diameters to avoid excessive increases in velocity in response to the admission of the successive solvent streams.

The temperature of the mixed stream in said coil 2 is preferably reduced at a rate between two and six seconds per degree of Fahrenheit temperature. A suitable decrease in temperature is shown in a specific example at the right hand side of the coil 2, where indicators 32 are connected to successive stages in the pipe coil.

The specific illustration of temperatures, relative volumes, etc., are merely an example of one of our testing operations wherein we employed a solvent blend of 95% isopropyl acetate and 5% amyl acetate to dewax a petroleum lubricating oil stock having a pour point of 100° F., and containing about 9% wax. However, the invention is not limited to any specific solvent, nor to the specific example employed in describing the invention. Numerous other dewaxing solvents include methyl ethyl ketone which may be improved by adding toluol; acetone and benzol, isopropyl ether and butyl alcohol, methylene chloride and butyl alcohol, or any other suitable dewaxing solvent.

The drawing refers to incoming oil at a temperature of 180° F., but this merely refers to our specific example. Lower or higher temperatures may be employed. The same is true of other conditions in the illustrative example. More specifically stated, the incoming oil from pipe 5 is preferably at a temperature between 125° F. and 180° F., while the cooled solvent from pipe 8 may be at a temperature between 35° F. and 65° F. The temperature of within about 10° of the cloud point in pipes 15 and 17 may be between 75° F. and 95° F., the temperature of the solvent from pipe 29 may be 20° above or below zero; the mixture discharged at the bottom of coil 2 may be at a temperature between 30° F. and 50° F., and the resultant mixture may be quickly chilled in the chiller 21 and transmitted to the filter at any desired temperature. However, these specific temperatures are merely illustrative of desirable conditions, intended to more clearly set forth a specific arrangement of cooperative details, without limiting the scope of the patent to said temperature conditions.

In the second injection unit 2, we preferably adhere to a continuous stream line flow, at relatively low velocities, as distinguished from a turbulent flow, so as to positively provide for free selective growth of the numerous individual crystals, which could not occur under highly disturbed fluid conditions. The gradual ejection of the wax out of its normal liquid state in the solution is progressively accomplished not only by very gradual decreases in temperature, but also by the progressive anti-solvent properties of the solvent on the wax. We provide cooperative conditions in this step by step procedure which produce a natural growth of a nearly perfect wax crystal from its minimum unit size to approximately uniform enlarged dimensions, thereby forming approximately uniform wax crystals for economical separation of the wax from the oil.

We claim:

1. In the art of dewaxing oils the process of forming approximately uniform wax crystals which comprises introducing a heated stream of wax bearing oil into an elongated blending passageway, injecting streams of relatively cool dewaxing solvent into the stream of wax bearing oil at successive stages in said passageway to gradually form a cooled solution containing minute wax nuclei crystals at approximately the cloud point of the solution, thereafter injecting streams of colder dewaxing solvent into the stream of waxy solution at successive additional stages to progressively deposit additional wax around said minute wax nuclei crystals, thereby gradually increasing the dimensions of the individual crystals, progressively increasing the volumes of said streams of colder dewaxing solvent at said additional stages to more rapidly increase the growth of the wax crystals, causing the mixed stream in said additional stages to move at linear velocities between one-fourth of a foot and three feet per second, cooling the solution to the desired dewaxing temperature, and filtering the liquid solution from the resultant approximately uniform wax crystals.

2. In the art of dewaxing oils the process of forming approximately uniform wax crystals which comprises introducing a heated stream of wax bearing oil into an elongated blending passageway, forcibly mixing streams of relatively cool dewaxing solvent with the stream of wax bearing oil at successive stages in said blending passageway to gradually form a cooled solution containing minute wax nuclei crystals at approximately the cloud point of the solution, thereafter injecting streams of colder dewaxing solvent into the stream of waxy solution at successive additional stages to progressively deposit additional wax around said minute wax nuclei crystals, thereby gradually increasing the dimensions of the individual crystals, separately regulating the flow of said streams of colder dewaxing solvent to provide for admission of relatively small but progressively increasing quantities of said colder solvent during initial stages of the growth of the wax crystals, so as to provide for most gradual and uniform preliminary growth during said initial stages, progressively increasing the volumes of said streams of colder dewaxing solvent at subsequent stages to more rapidly increase the rate of growth of the wax crystals, at the same time causing the mixed stream undergoing treatment to flow at a linear velocity between one-fourth of a foot and three feet per second, while reducing the temperature of the mixed stream at a rate between two and six seconds per degree of Fahrenheit temperature, separately cooling the resultant mixture to the desired dewaxing temperature, and then filtering the liquid solution from the wax crystals.

EDDIE M. DONS.
OSWALD G. MAURO.